United States Patent [19]

Kamo et al.

[11] 4,304,589
[45] Dec. 8, 1981

[54] BRIQUETTED FERTILIZER FOR FOREST FERTILIZATION

[75] Inventors: Seiichi Kamo, Yokohama; Tetzuo Watanabe, Kawasaki; Noriyasu Kuroda, Yokohama; Naoto Osako; Yoshinori Kaneko, both of Kitakyushu, all of Japan

[73] Assignee: Mitsubishi Chemical Industries, Limited, Tokyo, Japan

[21] Appl. No.: 164,693

[22] Filed: Jun. 30, 1980

Related U.S. Application Data

[63] Continuation of Ser. No. 769,325, Feb. 16, 1977, abandoned, which is a continuation of Ser. No. 565,562, Apr. 4, 1975, abandoned.

[30] Foreign Application Priority Data

Apr. 9, 1974 [JP] Japan .................................. 49/40216

[51] Int. Cl.$^3$ ......................... C05B 15/00; C05C 9/00
[52] U.S. Cl. ...................................... 71/29; 71/64 A; 71/64 F
[58] Field of Search ............... 71/28, 29, 64 A, 64 F, 71/33, 34, 54; 260/553 R, 553 B, 555 C

[56] References Cited

U.S. PATENT DOCUMENTS

| | | |
|---|---|---|
| Re. 27,238 | 11/1971 | Stansbury ............................. 71/64 F |
| 3,024,098 | 3/1962 | Austin .................................. 71/64 F |
| 3,054,669 | 9/1962 | Jung ........................................ 71/28 |
| 3,219,432 | 11/1965 | Schafer .................................... 71/29 |
| 3,232,740 | 2/1966 | Sor ....................................... 71/64 F |
| 3,322,528 | 5/1967 | Hamamoto ............................. 71/29 |
| 3,459,529 | 8/1969 | Weisboeck ............................. 71/28 |
| 3,502,458 | 3/1970 | Schenk ................................. 71/64 F |
| 3,580,715 | 5/1971 | Dilday .................................... 71/28 |
| 3,647,416 | 3/1972 | Messman ................................ 71/29 |
| 3,697,245 | 10/1972 | Dilday .................................... 71/28 |
| 3,725,029 | 4/1973 | Blackmore ............................. 71/28 |
| 3,925,053 | 12/1975 | Kealy .................................... 71/64 F |
| 3,962,329 | 6/1976 | Schoenaich ............................. 71/41 |

FOREIGN PATENT DOCUMENTS

| | | |
|---|---|---|
| 2515425 | 10/1975 | Fed. Rep. of Germany .......... 71/28 |
| 47-7329 | 3/1972 | Japan .................................. 71/64 F |
| 47-13083 | 4/1972 | Japan .................................. 71/64 F |
| 949408 | 8/1961 | United Kingdom ................... 71/28 |

Primary Examiner—Ernest G. Therkorn
Attorney, Agent, or Firm—Oblon, Fisher, Spivak, McClelland & Maier

[57] ABSTRACT

A briquetted fertilizer for forest fertilization having a volume of from 5 to 100 cm$^3$ which comprises compression molded granular isobutylidene diurea and heavy mineral oil.

7 Claims, No Drawings

BRIQUETTED FERTILIZER FOR FOREST FERTILIZATION

This application is a continuation of application Ser. No. 769,325, filed Feb. 16, 1977, now abandoned, which in turn is a continuation of application Ser. No. 565,562, filed Apr. 4, 1975, now abandoned.

BACKGROUND OF THE INVENTION

1. Field of the Invention

The present invention relates to a briquetted fertilizer which is suitable for forest fertilization.

2. Description of the Prior Art

In general, from the viewpoint of the growth of trees, fertilization is most important during the period of from 3 to 5 years after the transplantation of the seedling. In the transplantation itself, a compound fertilizer or a straight fertilizer, such as urea have generally been employed. However, these fertilizers become ineffective in about one year, even if they are of the type which is gradually efficacious. Therefore, it is necessary to apply a topdressing once a year during the first five years after the transplantation of the seedling. This process requires a significant amount of labor because it must be done on an individual, one by one, basis for each tree in a very wide area such as a tree-planting field. However, if a fertilizer can be obtained which is capable of maintaining its effect over a period of about 3 to 5 years while seedlings are being vigorously grown, the topdressing will not be needed. The fertilizer placed on the planting pit at the time of planting will suffice.

Unfortunately, no such fertilizer has yet been reported. Various means for maintaining the effect of a fertilizer over an extended period of time have been suggested: e.g., a method is known of obtaining a fertilizer granule of large diameter by compression molding a gradually efficacious fertilizer. However, the granulated fertilizer thus obtained is lacking in the capability for shape retention in water so that it is not effective as a maintenance fertilizer for trees. Moreover, it is very difficult to compression mold a fertilizer component by itself and the resulting molding yield is low. Thus, such a method is not practical. Consequently, it would be most desirable to have a fertilizer for trees which may be applied when seedlings are transplanted and which remains efficacious throughout long periods of vigorous seedling growth.

SUMMARY OF THE INVENTION

Accordingly, it is one object of the present invention to provide a briquetted fertilizer which is capable of maintaining its fertilizing effect for from 3 to 5 years when used for forest fertilization.

Briefly, this and other objects of this invention as will be hereinafter made clear by the ensuing discussion, have been achieved by providing a briquetted fertilizer comprising compression molded granular isobutylidene diurea and heavy mineral oil.

DETAILED DESCRIPTION OF THE PREFERRED EMBODIMENTS

The basis of the present invention is the discovery that a tightly molded fertilizer can be easily obtained by compression molding isobutylidene diurea as a fertilizer component with a heavy mineral oil. The briquetted fertilizer thus obtained retains its shape in water for more than one year, and, even if the fertilizer granule is disintegrated, the resulting particles are solid.

Isobutylidene diurea used as the fertilizer ingredient in the present invention is a compound obtained by condensation reacting 2 moles of urea and 1 mole of isobutylaldehyde. It is generally used in granules of isobutylidene diurea fertilizer commercially available for use as a gradually efficacious fertilizer. In addition to the isobutylene diurea, 5 to 30% by weight of a fertilizer ingredient such as water-insoluble or 2% citric-acid-soluble calcined phosphate, fused phosphate, phosphate rock or gradually efficacious potassium phosphate may be blended to provide a P and/or a K component. These granular fertilizers are generally adjusted to possess 1 to 15%, preferably 3 to 10% of water content since they can then be compression molded more easily.

The heavy mineral oil used in this invention can be a lubricating oil although similar heavy oils, for example, heavy oil, etc. can be used. Suitable lubricating oils include, for example spindle oil, dynamo oil, turbine oil, machine oil, mobile oil, fluid paraffin, or the like. Suitable heavy fuel oils include heavy oil C, minas heavy oil, or the like. Although they are normally liquid at ordinary temperatures, the heavy mineral oils may preferably be heat treated at temperatures of up to 100° C. before use because of their high viscosities. The heavy fuel oils, such as minas heavy oil, which are solids at ordinary temperatures may be used in the liquid state by pre-heating at 50° to 100° C.

One or more of the various kinds of heavy mineral oils are added to the fertilizer granules or sprayed onto the molding zone of the molding machine at the time of compression molding. The amount of heavy mineral oil added is ordinarily selected from the range of 1 to 5%, based on the weight of the fertilizer granules, preferably 2 to 3%, although the amount is not particularly critical. However, if the amount is too small, desirable molding yields cannot be obtained and the shape retention time in water becomes less than one year. Therefore, sufficient long term maintenance of the fertilizer effect is not obtained. On the other hand, if the amount of oil is too large, the percentage of the fertilizer component in the resultant molded fertilizer decreases. In this case, it is preferable to use inorganic salts (for example, the calcium salt) of lignin sulfonic acid or asphalts together with the heavy mineral oil in about the same amount since, thereby, the molding yield is increased.

Considering both the optimum maintenance of fertilizing effect and granule moldability, the volume of the final molded form should be 5 to 100 cm$^3$. The hardness of the molded product varies with the shape and volume. However, if it is too low, the shape retention deteriorates so that sufficient maintenance of fertilized effect is not obtained and the molded form becomes powdered or broken. Therefore, in order to ensure that the molding is carried out successfully, molding pressure should be sufficient so that the hardness of the molded form is at least above 2 kg/cm$^2$. For example, when a briquette machine is used, this may be accomplished by appropriately adjusting the gap between the rolls, the feed rate of raw materials, etc. In one method for successfully obtaining the fertilizer of the present invention, a briquette of high hardness is produced in a high yield, for example, by first spraying 0.5–3% by weight of lubricating oil into the molding zone of the briquette machine and molding a granule of isobutylene diurea together with 1 to 5% by weight of heavy oil.

The briquetted fertilizer of the present invention is very useful for forest fertilization since the fertilizer effect necessary for trees can be maintained over a long period of from 3 to 5 years with only one fertilization and without any initial salt damage.

Having generally described the invention, a more complete understanding can be obtained by reference to certain specific examples, which are included for purposes of illustration only and are not intended to be limiting unless otherwise specified.

EXAMPLE 1

Isobutylidene diurea granules (Trade name: IBDU, made by Mitsubishi Chemical Industries Limited) of about 0.7 to 2 mm in particle diameter and about 6% in water content were compression molded into an almond form (34×34×20 mm) by using a briquette machine while spraying 2%, based on the weight of isobutylidene diurea, of fluid paraffin onto the molding zone of the machine. The molded form was obtained in 72% molding yield and its hardness was 12 kg/cm².

EXAMPLE 2

The entire process of Example 1 was repeated except that spindle oil was used instead of fluid paraffin. A briquetted fertilizer having a hardness of 12 kg/particle in 74% molding yield was obtained.

EXAMPLE 3

The same isobutylidene diurea granules as in Example 1 were added to a stirring vessel with 2%, based on the weight thereof, of minas heavy oil (JIS Class 3, No. 2, commonly called heavy oil C No. 2). They were heated to 70° C. and mixed under stirring. The mixture obtained was compression molded using the same molding machine as in Example 1 while spraying a 2% content of spindle oil onto the molding zone of the machine to obtain a briquetted fertilizer with a hardness of 13 kg/particle in 90% molding yield.

EXAMPLE 4

Isobutylidene diurea granules were compression molded in the same manner as in Example 3 with the exception that fluid paraffin was substituted for spindle oil. A briquetted fertilizer of hardness of 13 kg/particle was obtained in a 88% molding yield.

EXAMPLE 5

Isobutylidene diurea granules were compression molded in the same manner as in Example 3 with the exception that 3% of asphalt and 2% of fluid paraffin were substituted for the minas fuel oil and spindle oil, respectively, to obtain a briquetted fertilizer of 14 kg/cm² in hardness in a 92% molding yield.

EXAMPLE 6

Isobutylidene diurea granules were compression molded in the same manner as in Example 3 with the exception of using 3% of calcium lignin sulfonate in place of the minas fuel oil without heating, and substituting a 2% content of fluid paraffin in place of the spindle oil to obtain a briquetted fertilizer of 13 kg/cm² in hardness in a 87% molding yield.

COMPARATIVE EXAMPLE 1

Isobutylidene diurea granules as used in Example 1 were compression molded alone. The yield of the molded form was 17% and the hardness was 14 kg/cm².

COMPARATIVE EXAMPLE 2

Isobutylidene diurea granules as used in Example 1 were compression molded while spraying molasses onto the molding zone of the molding machine so that the amount of molasses added was 3% of that of the IBDU. The yield of the molded form was 15% and the hardness was 15 kg/cm².

COMPARATIVE EXAMPLE 3

Isobutylidene diurea granules as used in Example 1 were charged into a vessel with a stirrer and, after adding 3%, based on the weight of the granules of asphalt heated to about 70° C., were compression molded. The yield of the molded form was 29% and the hardness was 14 kg/cm².

TEST EXAMPLE

Briquetted fertilizers obtained in Examples 1 to 6 and Comparative Example 2 were measured for shape retention in water, nitrogen releasing rate in soil and maintenance time of fertilizing effect.

The results are shown in Table 1.

TABLE 1

| Sample Product | Hardness in water (kg/particle) | Shape retention in water | Nitrogen releasing rate in the soil (%) | | | | Maintenance time of fertilizer effect |
| --- | --- | --- | --- | --- | --- | --- | --- |
| | | | 0.5 year | 1 year | 1.5 year | 2 year | |
| Example 1 | 10 | more than 1 year | 27 | 50 | 66 | 78 | about 3 years |
| Example 2 | 11 | " | 26 | 49 | 65 | 77 | " |
| Example 3 | 10 | " | " | " | " | 75 | " |
| Example 4 | 12 | " | 25 | 48 | 64 | 76 | " |
| Example 5 | " | " | 26 | 49 | " | 74 | " |
| Example 6 | | " | 28 | 53 | 70 | 88 | about 2 years and half |
| Comparative Example 2 | — | 11 months | 52 | 81 | 100 | — | about 1 year and 1 month |

The test method was as follows:

(1) Hardness

Compression breakage pressure was measured by a Kiya type grain hardness tester.

(2) Molding yield

The weight ratio of the completely molded form to the total weight of all granules fed to the molding machine was measured.

(3) Hardness after 5 days incubation in water 5 sample granules were placed into a 1 liter beaker containing 500 ml of water, and after allowed to stand for 24 hours, were taken out and measured for compression breakage pressure by a Kiya type grain hardness tester.

(4) Shape retention in water

Samples were allowed to stand for 1 year in a water tank through which city water flowed with a velocity of 5 l/hr. Thereafter, the shape retention was visually observed.

(5) Nitrogen releasing rate in the soil 1 kg of dried diluvium soil with a pH of 5.6 and an adjusted water content of 60% of the maximum content of water was placed into a 1/2,000 are porcelain pot. Samples were buried at a depth of 20 cm therein. The pot was covered with polyethylene film, sealed and preserved in an incubator at 30° C. The samples were taken out one by one half-yearly and analyzed as follows:

A sample taken out from the pot was allowed to stand in a 70° C. dryer for one night, and after removing soil, was crushed. The crushed sample was analyzed and the remaining nitrogen and the nitrogen releasing rate in the soil was obtained from the following formula:

$$\text{Nitrogen releasing rate in the soil} = 100 - \frac{\text{Weight of dried recovered product} \times N \text{ analytical value, \%}}{\text{Weight of dried fresh product} \times N \text{ original analytical value, \%}} \times 100$$

APPLIED EXAMPLE 1

Molded forms of isobutylidene diurea (IBUD) granules obtained by compression molding as in Example 1 were inserted into planting holes as fertilizer. The amount was sufficient for two years at a rate of 10 g/year of N for each three-years old afforesting cedar plant. The area compared as a control was fertilized with the immediately effective fertilizer, N 24-$P_2O_5$12-$K_2O$12, once a year. The growth after two years was as follows:

| Area of | Grown height* on the ground, cm | Thickness* of trunk, cm |
|---|---|---|
| Molded IBDU granule form | 135 | 2.8 |
| Immediately effective fertilizer | 121 | 2.4 |

*average value of 25 trees in each area

That is, the area treated with the molded IBDU granule forms in spite of not being fertilized at all with P and K fertilizer, and although it was allowed to stand as is after being fertilized only at the beginning of a two year period, had a plant growth equal to the area treated with the immediately effective fertilizer. Thus, the briquetted fertilizer of the present invention has been confirmed to be satisfactorily employable for forest fertilization.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A briquetted fertilizer for forest fertilization having a volume of from 5 to 100 cm$^3$, a shape retention time in water of over one year, active as a fertilizer for at least about three years after application and which consists essentially of a compression molded mixture of granular isobutylidene diurea having a water content of from 1 to 15 percent, 1 to 5 percent by weight of a heavy mineral oil as an unencapsulating or randomly mixed binder and up to 30 percent by weight of at least one member selected from the group consisting of water insoluble or 2 percent citrate soluble calcined phosphate, fused phosphate, phosphate rock and gradually efficacious potassium phosphate.

2. The briquetted fertilizer of claim 1, in which said compression molded mixture has a hardness of about 2 kg/cm$^2$.

3. The briquetted fertilizer of claim 1, in which said granular isobutylidene diurea has a water content of from 3 to 10 percent.

4. The briquetted fertilizer of claim 1, in which said compression molded mixture contains 2 to 3 percent by weight of the heavy mineral oil as the binder.

5. The briquetted fertilizer of claim 1, in which said heavy mineral oil is at least one member selected from the group consisting of spindle oil, turbine oil, machine oil, mobile oil, fluid paraffin, heavy oil C and minas heavy oil.

6. The briquetted fertilizer of claim 1, in which said compression molded mixture contains 5 to 30 percent by weight, of at least one member selected from the group consisting of calcined phosphate, fused phosphate, phosphate rock and potassium phosphate.

7. The briquetted fertilizer of claim 1, which is produced by adding 1 to 5 percent by weight of a heavy mineral oil maintained at a temperature between room temperature and 100° C. to isobutylidene diurea granules of 1 to 15 percent in water content by use of a briquetting machine so that the resulting product has a hardness of about 2 kg/cm$^2$.

* * * * *